(12) United States Patent
Fiori

(10) Patent No.: US 7,845,929 B2
(45) Date of Patent: Dec. 7, 2010

(54) DEVICE AND METHOD FOR CONTROLLING THE CONDENSATE AND/OR FROST FORMATION IN CHOCOLATE SHELL PRODUCTION

(75) Inventor: Gerolamo Fiori, Albuzzano (IT); Viviana Bertolotti, legal representative, Albuzzano (IT); Cecilia Fiori, legal representative, Albuzzano (IT)

(73) Assignee: Carle & Montanari S.p.A., Rozzano (Milan) (IT)

( * ) Notice: Subject to any disclaimer, the term of this patent is extended or adjusted under 35 U.S.C. 154(b) by 1150 days.

(21) Appl. No.: 10/531,923

(22) PCT Filed: Oct. 20, 2003

(86) PCT No.: PCT/IB03/04607

§ 371 (c)(1),
(2), (4) Date: Aug. 14, 2006

(87) PCT Pub. No.: WO2004/034800

PCT Pub. Date: Apr. 29, 2004

(65) Prior Publication Data

US 2007/0110858 A1 May 17, 2007

(30) Foreign Application Priority Data

Oct. 21, 2002 (IT) .......................... BO2002A0664

(51) Int. Cl.
  *A23G 1/20* (2006.01)
  *A23G 3/12* (2006.01)
  *B29C 35/04* (2006.01)
(52) U.S. Cl. .............. 425/342.1; 425/453; 425/DIG. 9; 426/515; 426/524
(58) Field of Classification Search ................. 249/135; 425/104, 342.1, 387.1, 453, DIG. 9; 426/515, 426/524, 660
See application file for complete search history.

(56) References Cited

U.S. PATENT DOCUMENTS 4,648,829 A * 3/1987 Cattani .................... 425/326.1

(Continued)

FOREIGN PATENT DOCUMENTS

EP 0914776 A 5/1999

(Continued)

*Primary Examiner*—Yogendra N Gupta
*Assistant Examiner*—Emmanuel S Luk
(74) *Attorney, Agent, or Firm*—William J. Sapone; Coleman Sudol Sapone P.C.

(57) ABSTRACT

A device for controlling the condensate or frost formation in chocolate shell production has a mould (2), provided with a plurality of recesses (3) for liquefied of softened chocolate (4) and a die (5) cooled by cooling means (7) and including a plurality of protrusions (6), each fit to be inserted into a respective below recess (3) to mould a chocolate shell, in cooperation therewith, in a maximum approach condition (A) between the die (5) and the mould (2). The device (1) further includes: at least one supply means (8) whose outlet (9) flows directly into the environment and it is orientated in the direction of protrusions (6); dehumidification means (10) to feed the at least one supply means (8) with dehumidified air (50). The supply means (8) is fit to blow dehumidified air (50) nearly at ambient pressure, at least in mutual detachment conditions (D) of mould (2) and die (5), toward the protrusions (6) so preventing the formation thereon of water condensate or frost.

11 Claims, 4 Drawing Sheets

U.S. PATENT DOCUMENTS

| | | |
|---|---|---|
| 5,409,722 A | 4/1995 | Binley |
| 6,220,151 B1 * | 4/2001 | Bindler .................. 99/353 |
| 6,268,006 B1 | 7/2001 | Knobel |
| 6,383,530 B1 * | 5/2002 | Iwashita et al. ............ 426/19 |
| 6,419,970 B1 * | 7/2002 | Willcocks et al. .......... 426/306 |
| 7,097,871 B2 * | 8/2006 | Rudie et al. ............... 426/524 |
| 7,582,319 B2 * | 9/2009 | Klaes ..................... 426/245 |
| 2001/0028909 A1 * | 10/2001 | Kashulines et al. ......... 426/512 |
| 2008/0026131 A1 * | 1/2008 | Benjamin et al. ........... 426/660 |
| 2008/0274241 A1 * | 11/2008 | Steuer et al. ............... 426/231 |

FOREIGN PATENT DOCUMENTS

| | | |
|---|---|---|
| EP | 0923876 A | 6/1999 |
| EP | 0945069 A | 9/1999 |
| EP | 1103188 A | 5/2001 |

\* cited by examiner

DEVICE AND METHOD FOR CONTROLLING THE CONDENSATE AND/OR FROST FORMATION IN CHOCOLATE SHELL PRODUCTION

TECHNICAL FIELD

The present invention relates to the technical field regarding the production of chocolate food products and it refers to a device and to a method for controlling the condensate or frost formation in chocolate shell production, particularly by means of a mould provided with a plurality of recesses for liquefied and/or softened chocolate and with a cooled die including a plurality of protrusions each fit to be inserted in a respective recess in order to form, in cooperation with the latter, a chocolate shell.

BACKGROUND ART

There are known devices, fit to prevent the noxious formation of water condensate or frost on the protrusions, said devices being provided with a room delimited by side walls, by mould and die and kept in overpressure by air feed means to control the temperature of said air at values lower than the condensation values.

There are also known devices in which the mould and the die for chocolate shells are housed in a closed container, in which the temperature is maintained substantially below the temperature of the countermould by control means of air temperature.

The main drawbacks of said known devices and methods consist in that said rooms and containers are difficult to be made, are expensive and cannot be assembled in non prearranged machines; furthermore in order to keep controlled the air temperature in such rooms and containers, it is necessary to limit the range of the protrusion temperature and generally the operation modes of the machine.

DISCLOSURE OF THE INVENTION

An object of the present invention is to propose a device for controlling the condensate or frost formation in chocolate shell production, whose portion which is associated to die and mould has small dimensions, flows directly in the environment and that, therefore, it does not require rooms or containers.

Other object of the present invention is to propose a method for avoiding the humidity condensation on the die by blowing dehumidified air at the surface thereof with adjustable temperatures in a wide range of values also higher than the temperature values of die protrusion.

BRIEF DESCRIPTION OF THE DRAWINGS

The characteristics of the present invention are underlined in the following with particular reference to the attached drawings, in which.

BEST MODE OF CARRYING OUT THE INVENTION

Figure 1:
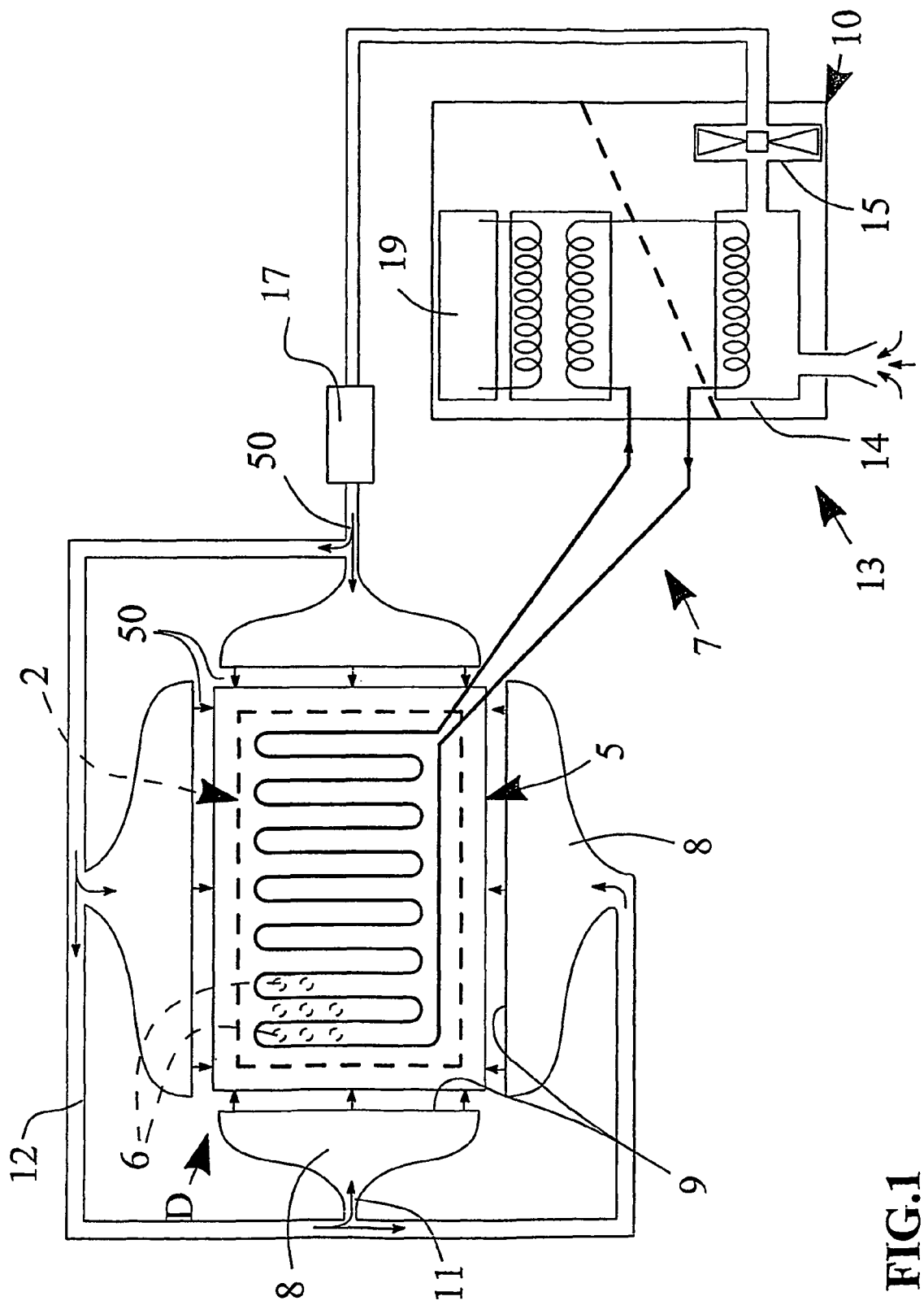
FIG. 1 shows a schematic view of the device of the present invention.
Figure 2:
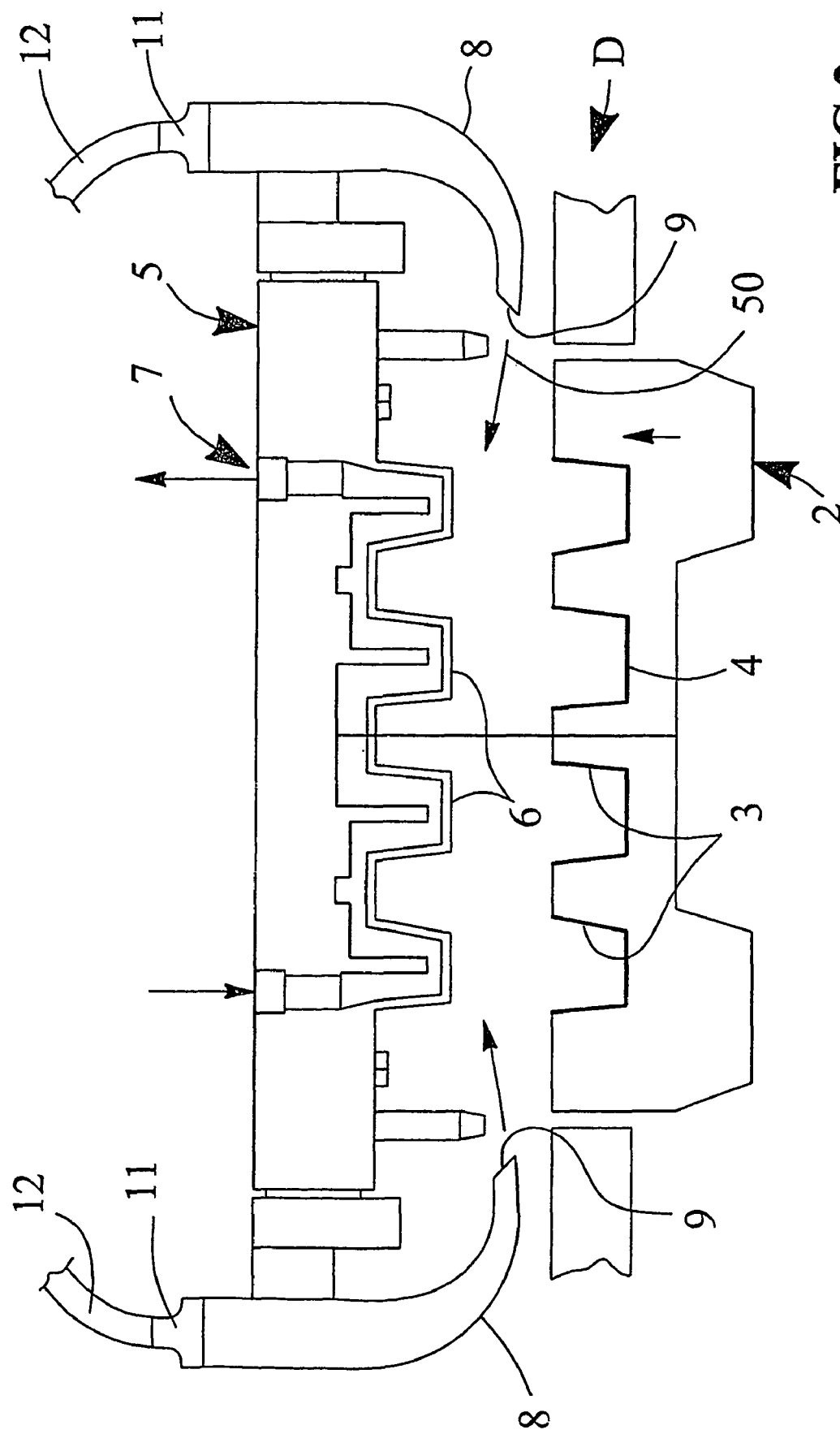
FIG. 2 shows a schematic and partial view of a portion of FIG. 1 device including a mould and a die in a condition of mutual detachment thereof.
Figure 3:
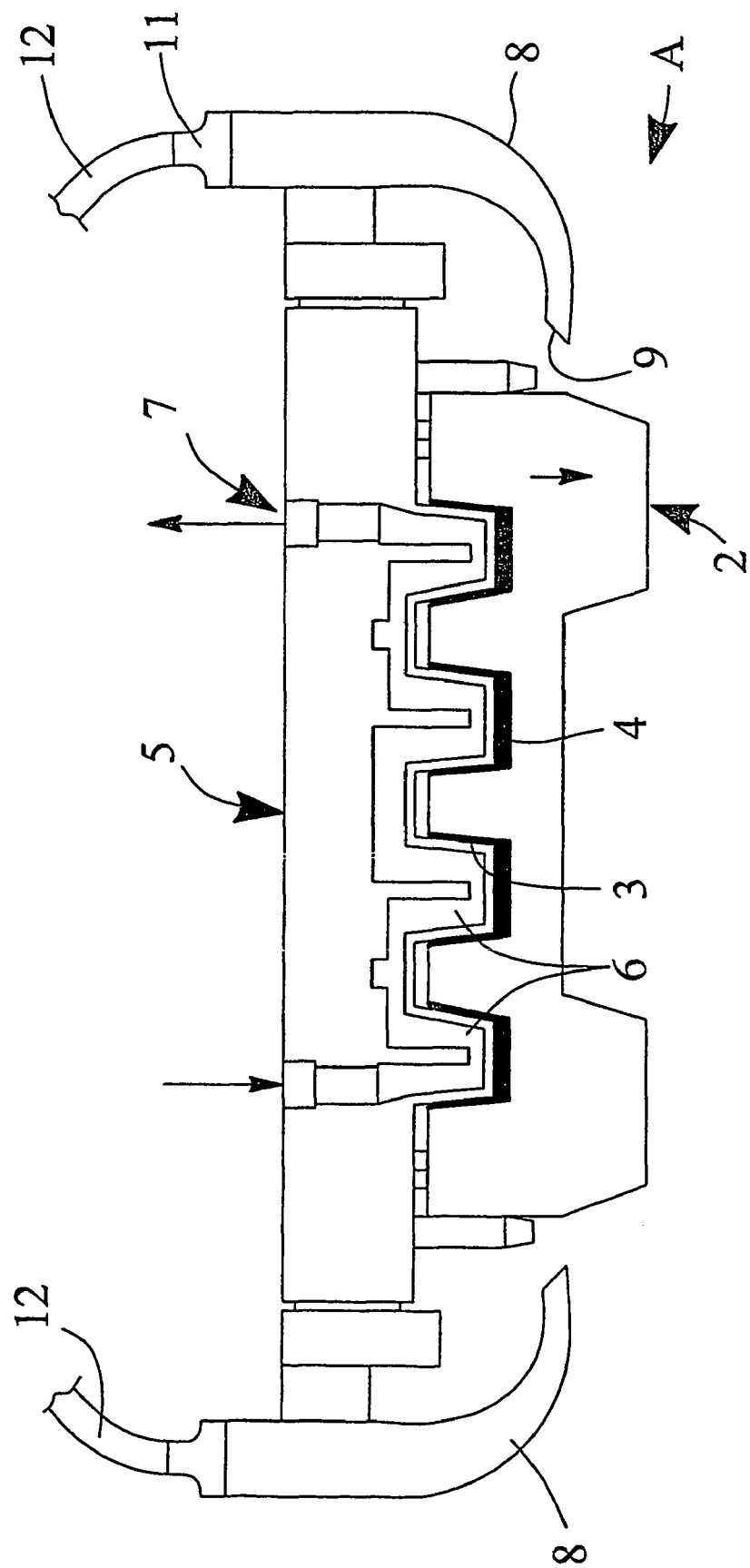
FIG. 3 shows a view of the portion of FIG. 2 device in a condition of mutual approach of mould and die.

With reference to FIGS. 1 to 3, numeral 1 indicates the device for controlling the condensate or frost formation in the chocolate shell production including a mould 2 provide with a plurality of recess 3 for liquefied or softened chocolate 4 and a die 5 including a plurality of protrusions 6 cooled by cooling means 7.

The mould 2 is horizontally positioned below the die 5 and it is vertically driven by a respective lifting means, including electric, pneumatic or hydraulic actuators, of known type and not shown, between a condition of maximum approach A, in which each protrusion 6 is inserted in a respective underlying recess 3 to form a chocolate shell and a condition of mutual detachment D, in which the mould 2 which has moulded shells is removed in order to replaced by another mould 2 whose recesses 3 bear the chocolate to be moulded.

The cooling means 7 include a plurality of ducts extending in the protrusions 6 of die 5 and which are flown by a cooling means, consisting of a glycol solution, an antifreeze fluid or a refrigerant fluid, cooled by refrigerating machine 13 including an expansion refrigerator 19.

The refrigerating machine 13 includes dehumidification means 10 provided with a radiator exchanger 14 and with blowing means 15 for feeding with dehumidified air 50 a whole of supply means 8, fixed to die 5.

The radiator exchanger 14 is internally crossed and cooled by the cooling fluid of cooling means 7 or by another fluid refrigerated by the refrigerating machine 13 and it is crossed by an air flow produced by the blowing means 15 of fan type.

The humidity of the ambient air is condensed on the external surface of radiator exchanger, which thus produces the dehumidified air 50 by condensation.

The air coming out from the dehumidification means 10 is directed by a duct 12, including filter means 17 for instance with actived carbon, up to connections 11 of supply means 8.

Each supply means 8 has an approximately bent delta shape with a side having an outlet 9 for the dehumidified air 50 and the opposed vertex having the connection 11.

The outlet 9 of each supply means 8 flows directly in the environment, it is oriented in direction of protrusions 6 and it is fit to blow the dehumidified air 50, in the mutual detachment condition D of mould 2 from die 5, at nearly ambient pressure, in order to avoid condensate or frost formation on the protrusions 6.

The outlet 9 of each supply means 8 is aligned with or below the lower face of die 5, having the protrusions 6, and it is inclined toward said face; besides the outlet has an extended shape and it is approximately parallel to a respective side of the die 5.

Each outlet 9 has a length approximately equal to the length of the corresponding side of die 5.

In the shown embodiment, the device 1 include a supply means 8 for each side of die 5, but the invention also provides that only one, two or three sides of the rectangular die 5 have a respective supply means 8.

The invention further provides that the device has only one supply means 8 provided with outlets 9 corresponding to two or more sides of die 5.

Figure 4:
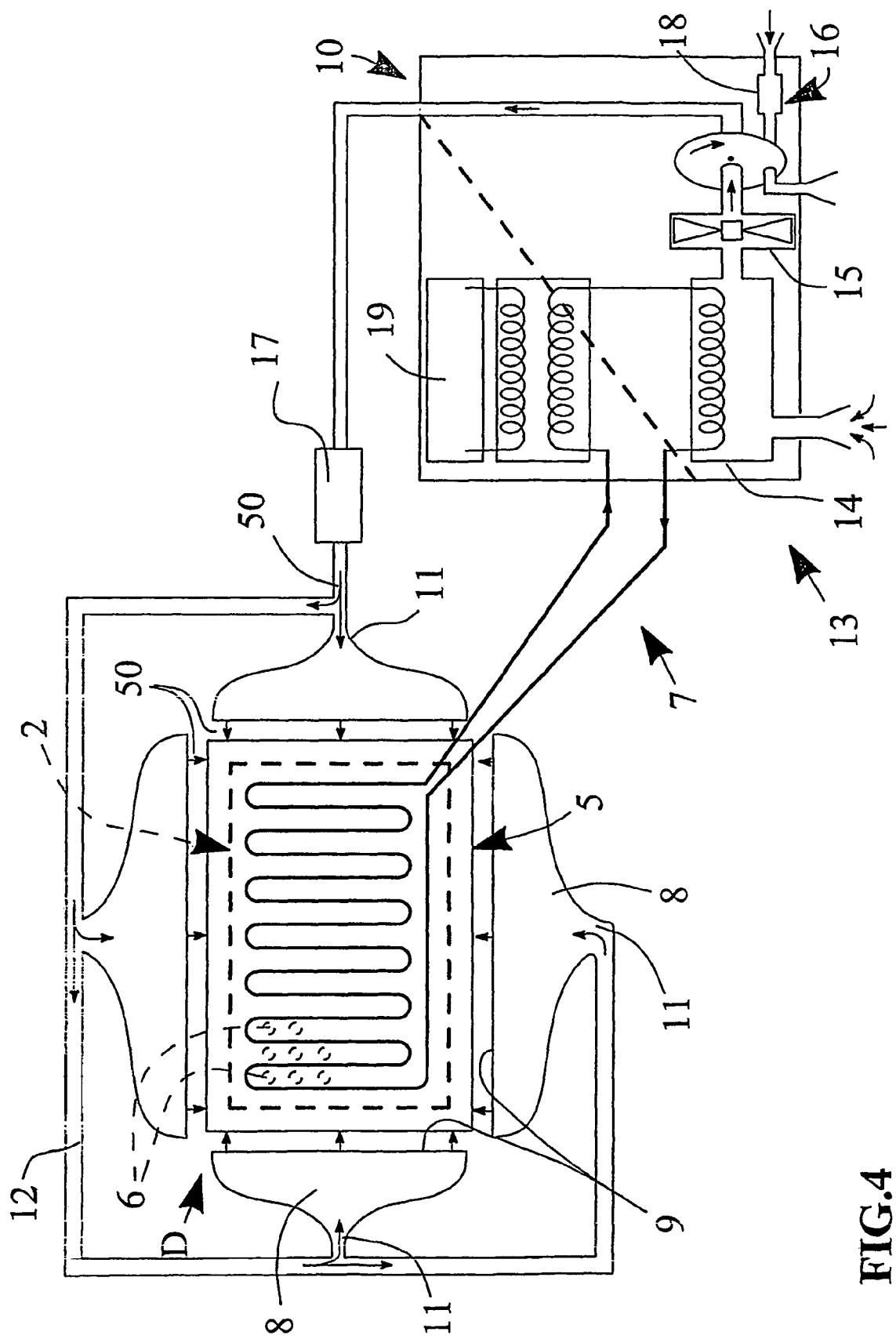
FIG. 4 shows a schematic view of a variant of FIG. 1 device.

In the variant of FIG. 4, the dehumidification means 10 of device 1 include, downstream the radiator exchanger 14 and in flow communication thereto, a drier 16 with rotating disks having hygroscopic material to absorb the residual damp of the dehumidified air 50.

The rotating disks, of known type, are crossed by a plurality of transversal openings whose inner surface has the hygroscopic material, for instance, consisting of lithium chlorate salts or, preferably, silica gel.

The rotation of the disk alternatively sets each transversal opening in communication with the flow of air to be dehumidified, which transfers the humidity to the hygroscopic material, and with a countercurrent flow of heated air produced by a hot air generator 18, which dehydrates said material predisposing it for a following cycle.

The device operation according to the method for controlling the condensate and/or frost formation in chocolate shell production of the present invention provides to blow the dehumidified air 50, in the mutual detachment condition D of mould 2 from die 5, nearly at ambient pressure, in direction of protrusions 6 by the supply means 8, positioned at each side of die 5, and whose outlets 9 flow directly in the environment, preventing the condensate or frost formation on the face of die 5 having the protrusions 6.

The air, which is immediately downstream the radiator exchanger 14, is cooled at a temperature between around 0° C. and around 30° C. and it has a humidity percentage ranging between 10% and 60%. The dehumidified air 50 by the absorption through the disk drier 16, as provided in the variant of FIG. 4, has a humidity ranging between around 0% and around 10% and it is heated, before the blowing, at a temperature included between around 5° C. and around 35° C., preferably of around 22° C.

Such heating of the dehumidified air 50 is carried out by thermal energy transferred from the hot air generator 18 to the disks through the dehydration air of the hygroscopic material.

The method further provides to use in the exchanger 14 a fluid cooled by the cooling means 7 of die 5; to filter, through the filter means 17, the dehumidified air 50 prior the blowing and to stop or to reduce the blowing at the maximum approach condition A, by acting on the blowing means 15.

The humidity percentage and the temperature of the dehumidified air 50 are regulated by respective controls of the refrigerating machine 13, in accordance with the typology of chocolate 4 and/or the duration of maximum approach condition A with respect to the duration of a entire moulding cycle of the chocolate shell.

The invention also provides that at least a part of the air blown into the mould can be sucked by extractor fan means, known and not shown, and can flow thanks to said extractor fan means in the hot air generator 18 and/or fed in the radiator exchanger (14) together with the ambient air.

It must be observed that the air dehumidification allows to avoid condensate or frost formation on the protrusions in a very wide range of temperatures of said dehumidified air and that temperatures of many degrees above zero of such air do not endanger the protrusion cooling and the chocolate moulding because the low thermal capacity of air and the blowing at ambient pressure and low speed do not cause a significant temperature increase of protrusions.

The main advantage of the present invention is to provide a device for controlling the condensate or frost formation in chocolate shell production, whose portion which is associated to the die and the mould has small dimensions, flows directly in the environment and, therefore, does not require rooms or containers.

Other advantage of the present invention is to provide a method for avoiding the humidity condensation on the die by blowing dehumidified air at the surface thereof, at ambient pressure and directly flowing out in the environment, with adjustable temperatures in a wide range of values even higher than the temperature values of die protrusion or negative Celsius degrees.

Further advantage is to provide a device and a method, which can be easily assembled in preexistent and unarranged machines.

The invention claimed is:

1. A device for controlling condensate or frost formation during chocolate shell production comprising:
   a mould (2) provided with a plurality of recesses (3) for holding liquefied or softened chocolate (4);
   a die (5), cooled by cooling means (7) and including a plurality of protrusions (6), each protrusion fit to be inserted into a respective chocolate containing recess (3) of the mould to form a chocolate shell, when the cooled die is moved into a maximum approach condition (A) between the die (5) and the mould (2);
   at least one supply means (8) having an outlet (9) for delivering dehumidified air directly into an environment located between the die and the mould, the outlet orientated in a direction facing the protrusions (6);
   dehumidification means (10) for feeding the supply means (8) with dehumidified air (50);
   the supply means (8) being sized to deliver a flow of the dehumidified air (50) nearly at ambient pressure, to the environment created when the mould and the die are in a detached condition (D).

2. The device according to claim 1 wherein the outlet (9) of the supply means (8) has an elongated shape and is approximately positioned parallel to a side of die (5).

3. The device according to claim 1 wherein the outlet (9) is aligned to or below the die (5) and is inclined toward the die.

4. The device according to claim 1 wherein the outlet (9) has a length approximately equal to a length of a side of die (5).

5. The device according to claim 1 further comprising a plurality of supply means (8) for facing each side of the die (5).

6. The device according to claim 1 wherein the supply means (8) has an approximately bent delta shape, a side of the supply means having the outlet (9), an opposed vertex of the supply means having a connection (11) for pneumatically connecting a duct (12) to the dehumidification means (10).

7. The device according to claim 1 wherein the supply means (8) is fixed to the die (5) and the mould (2) is located below the die, the mould being vertically driven by lifting means between the maximum approach condition (A) and the detached condition (D).

8. The device according to claim 1 wherein the dehumidification means (10) include a radiator exchanger (14), ambient air passing by the radiator exchanger to obtain dehumidified air (50), blown in the duct (12) by blowing means (15); the radiator exchanger (14) being cooled by a cooling fluid, refrigerated by a refrigerating machine (13), the cooling fluid being fed to the die by the cooling means (7).

9. The device according to claim 1 wherein the dehumidification means (10) include a drier (16) with rotating disks provided with hygroscopic material in order to dehumidify the air (50).

10. The device according to claims 8 or 9 wherein the dehumidification means (10) are located downstream from a radiator exchanger (14).

11. The device according to claim 6 wherein the duct (12) includes filter means (17) for filtering the dehumidified air (50).

* * * * *